United States Patent [19]

Dujari

[11] Patent Number: 5,504,591
[45] Date of Patent: Apr. 2, 1996

[54] SYSTEM AND METHOD FOR COMPRESSING GRAPHIC IMAGES

[75] Inventor: Rajeev Dujari, Kirkland, Wash.

[73] Assignee: Microsoft Corporation, Redmond, Wash.

[21] Appl. No.: 232,624

[22] Filed: Apr. 25, 1994

[51] Int. Cl.$^6$ ............... H04N 1/415; H04N 1/411; G06K 9/34; G06K 9/38

[52] U.S. Cl. ............ 358/426; 358/261.3; 358/262.1; 358/432; 358/433; 382/197

[58] Field of Search ............ 358/261.1, 261.2, 358/261.3, 262.1, 427, 432, 433, 445, 447, 448, 426, 429, 430; 382/9, 51, 197, 316

[56] References Cited

U.S. PATENT DOCUMENTS

| | | | |
|---|---|---|---|
| 4,053,930 | 10/1977 | Ogawa | 358/261.1 |
| 4,097,903 | 6/1978 | Nakagome et al. | 358/261.2 |
| 4,470,073 | 9/1984 | Nakamura et al. | 358/261.1 |
| 4,539,587 | 9/1985 | Eby et al. | 358/261.1 |
| 4,701,803 | 10/1987 | Sato | 358/261.1 |
| 4,783,828 | 11/1988 | Sadjadi | 382/197 |
| 4,982,293 | 1/1991 | Ishii | 358/261.3 |
| 5,067,023 | 11/1991 | Kim | 358/261.1 |
| 5,305,111 | 4/1994 | Chao et al. | 358/426 |
| 5,414,526 | 5/1995 | Friedman | 358/426 |

*Primary Examiner*—Edward L. Coles, Sr.
*Assistant Examiner*—Kimberly A. Williams
*Attorney, Agent, or Firm*—Seed and Berry

[57] ABSTRACT

A system and method for compressing raster graphic or bit-map data reduces the storage requirements for the bit-map data. The system divides the bit-map data into one or more chaingons, which are a series of pixels that are contiguous in either the horizontal direction, the vertical direction, or diagonally. Each chaingon is defined by its starting location in the bit-map, and its length. Each chaingon is encoded separately using delta encoding with respect to the starting location of the chaingon. The delta encoding uses variable length data codes where the most common delta values are assigned the fewer data bits and the less common delta values are assigned more data bits. The delta encoded chaingons may be compressed to save additional storage space. The system may be readily used in any computer system where bit-map data files are stored or transmitted to a second computer. The invention is particularly useful in printers or facsimile machines where character fonts are transmitted along with text data. The character fonts may be processed using the present invention prior to transmission.

31 Claims, 6 Drawing Sheets

5,504,591

SYSTEM AND METHOD FOR COMPRESSING GRAPHIC IMAGES

TECHNICAL FIELD

The invention relates generally to a system and method for data compression and, more particularly, to a system and method for compressing raster graphic images.

BACKGROUND OF THE INVENTION

The use of graphics in computer applications is very widespread. The transmission of a document between computers often includes the transmission of graphical data such as character fonts. This includes the transmission of facsimile messages from one facsimile (FAX) machine to another FAX machine, or the transmission of data from a host computer to a printer.

Graphical data may be transmitted as raster graphics data in which the graphic image is rendered into a bit-map data file prior to transmission. For example, a FAX machine scans a document and generates a bit-map data file for each page. The bit-map data file is compressed prior to transmission to reduce the transmission time. This compression permits greater computing efficiency and also saves money if the facsimile telephone call is a long distance call. There are a number of well known facsimile compression standards that are defined by standards established by The International Telegraph and Telephone Consultative Committee (CCITT). Despite their widespread use, data compression using the CCITT compression standards is slow and does not result in efficient compression of a graphic image.

Computers, such as those that are part of a printer coupled to a host computer, may transfer image data relating to the pages to be printed by the printer. Often the printer receives character fonts embedded within text data. The printer can use the embedded character font to print high quality output in the desired font. A common element in all of these examples is that one computer sends an image to a second computer.

The resources required to transfer the image data vary from system to system. For example, some word processing systems, such as the Microsoft Word™ word processor, require a powerful central processing unit (CPU) with sophisticated computing capability and large amounts of memory to process the image data. Similarly, printing systems such as those using the PostScript™ software, require a great deal of data processing by both the transmitting computer and the receiving computer. Again, this requires both a powerful CPU and large amounts of memory.

The types of image transmission systems described above may not be appropriate for use in low-cost systems where the cost of a powerful CPU and large amounts of memory is not acceptable. Therefore, it can be appreciated that there is a great need for a system and method for compressing raster graphic images and transferring image data without requiring a powerful CPU and large amounts of memory.

SUMMARY OF THE INVENTION

The present invention is embodied in a system for compressing a bit map data file that represents an orthogonal array of pixels having a series of pixels arranged in a first dimension and a plurality of the series of pixels arranged in the second dimension where each of the pixels has first and second logic states. A chaingon generator analyzes the bit map data file and divides the bit map data file into a plurality of chaingon regions, each of the chaingon regions comprising adjacent pixels having the first logic state. An encoding analyzer analyzes each of the plurality of chaingon regions and encodes the pixels in each of the chaingon regions to generate encoded data for each of the chaingon regions. A compressed data storage area receives and stores the encoded data.

In one embodiment the encoding analyzer uses delta encoding. The system may further include a compressor receiving the encoded data and generating compressed encoding data. The compressor may compress the encoded data using a predetermined compression format comprising at least one of a RLE compression, LZ compression, and Huffman compression.

The system may further include a change vector generator to sequentially analyze the plurality of series of pixels to determine locations in the first dimension at which the pixels in the series of pixels change from the first logic state to the second logic state and from the second logic state to the first logic state. The change vector generator creates a change vector table for each of the plurality of series of pixels. In this embodiment, the chaingon generator uses the change vector tables to divide the bit map data file into a plurality of chaingon regions, each of the chaingon regions comprising adjacent pixels having the first logic state.

In another alternative embodiment, the chaingon generator creates a chaingon list for each of the chaingon regions. The chaingon generator analyzes the bit map data file for a first and second sequential ones of the plurality of series of pixels in determining if the location of a first particular one of the series of pixels in the first sequential plurality of series of pixels is adjacent to a first particular one of the series of pixels in the second sequential plurality of series of pixels.

DETAILED DESCRIPTION OF THE INVENTION

Figure 1:
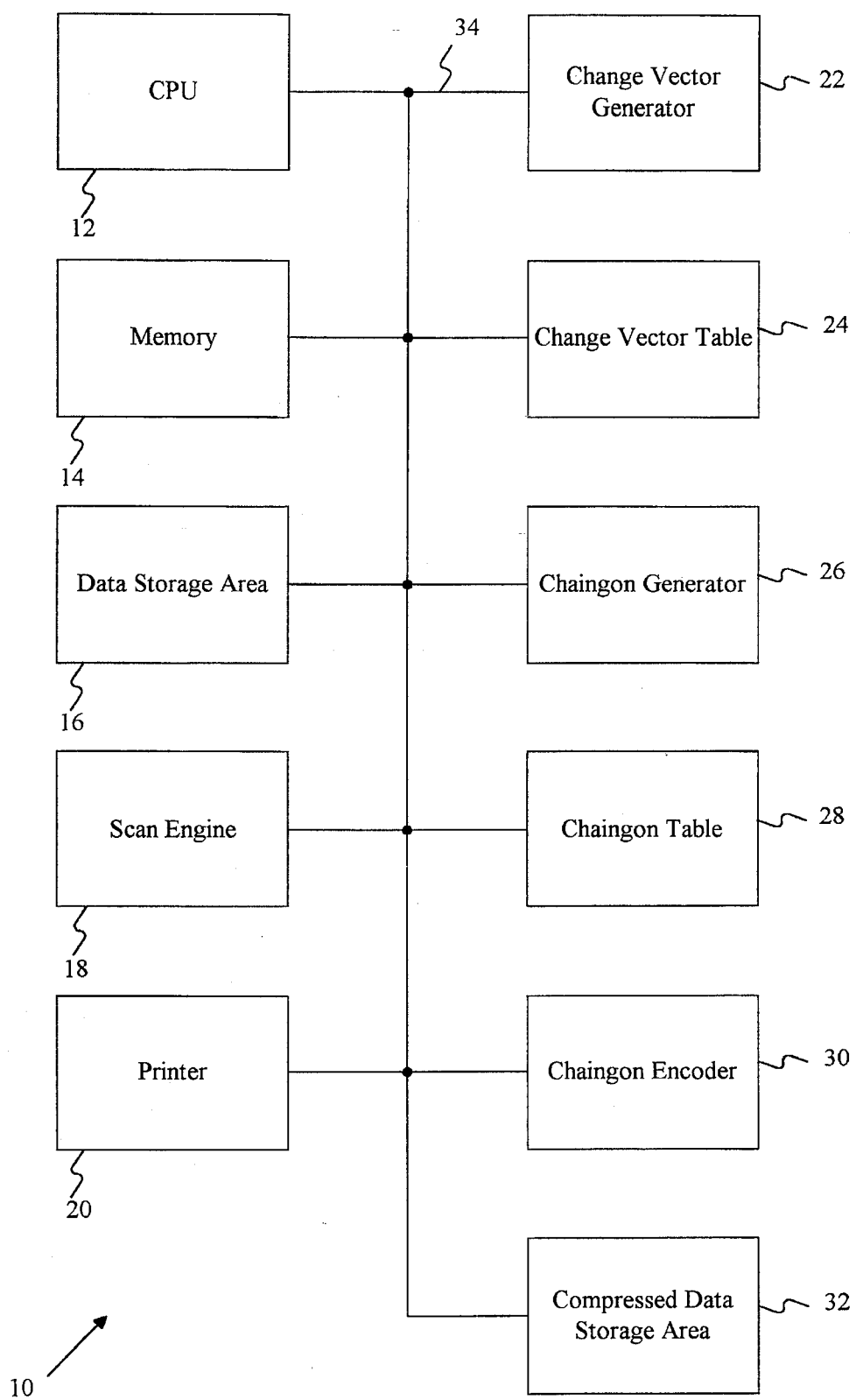
FIG. 1 is a functional block diagram of a system of the present invention.

The present invention provides a system for transferring image data from one computer to another without requiring a powerful CPU and large amounts of memory. Storage capacity and cost considerations make it impossible for devices such as printers to store every conceivable font type. Even with many stored font types, the printer must still have the flexibility to use new character fonts that may be desired. The system of the present invention processes raster data to greatly reduce the size of the raster data. This permits the flexibility of embedding new character fonts within the text data even in low-cost systems that do not have a powerful CPU and large amounts of memory. While prior art systems may embed a raster font, such as outline fonts, these systems require large amounts of memory to support even a single such font. For example, a outline font set typically requires approximately 60 kilobytes (Kbytes) of code used to process the font set and 40 Kbytes to 100 Kbytes for the outline of the font set. Thus, the transmission of a single outline font set may require as much as 160 Kbytes of memory. A typical printed page may contain several fonts such as Times-Roman, Times-Roman Bold, and Times-Roman Italics, each of which is considered a separate font that must be individually defined. Thus, the use of multiple fonts significantly increase the memory requirement.

In contrast, the system of present invention greatly reduces the size of the raster data for each font set to approximately 3 Kbytes to 15 Kbytes for each font set at a fixed resolution of 300 dots per inch (DPI). This permits the system of the present invention to be used on many low cost devices having relatively limited memory resources, such as copiers, facsimile (FAX) machines, printers, and the like. The reduced memory requirements makes it practical to embed a font set within a facsimile message. The dramatically reduced size of embedded font data also means that the transmission time of text data with an embedded font set is reduced. Reduced transmission time results in more efficient transfer of data and, in the case of some computers such as a facsimile machine, lower transmission costs. The system also provides flexibility in communication between devices such as those described above. The ability to incorporate the present invention into many devices gives greater interoperability than achievable with the prior art.

Bit-map data is considered to be a very low level data form. The receiving computer, whether it is a printer or a FAX machine, can use embedded character fonts without the sophisticated data processing required by some prior art systems, such as PostScript™, in which data is transferred in a high level format that requires a great deal of data processing. Thus, the present invention permits the use of less sophisticated microprocessors in the receiving computer which further reduces costs.

The image data processed by the present invention is a raster image, which is comprised of a sequence of horizontal scan rows. Each horizontal scan row is, in turn, made up of a series of pixels. Each pixel in the raster image is represented by one or more data bits. In its simplest form, there is a single data bit for each pixel indicating whether the pixel is "colored" or not. As can be appreciated, the term "colored" refers to whether the pixel is visible on the particular display medium. A simple display medium has a "background color", which indicates the data value of pixels that are invisible on the particular display medium. A "foreground color" refers to pixels that have a different data value than the data value for a background color and are thus visible on the particular display medium. For example, a typical printer, such as a laser printer has one data bit for each pixel to indicate whether or not the pixel is colored. The pixels have a first data value (i.e., first logic state) if they have the foreground color, such as black, and have a second data value (i.e., a second opposite logic state) if they have the background color, such as white. In contrast, a video display terminal may have pixels that have the first logic state for a white foreground color and the second logic state for a black background color. Thus, the same logic state may result in a different physical display depending on the particular display medium. The actual data values of the pixels depend on the particular display medium.

A typical printer, such as a laser printer, has one data bit for each pixel to indicate whether or not the pixel is colored. As discussed above, the pixels have a first logic state if they are colored (i.e., visible in the image) and have a second, opposite logic state if they are not colored (i.e., invisible in the image). In a typical printer, with 300 DPI resolution, this means that there are 300 pixels per inch in each horizontal scan row and 300 horizontal scan rows per inch. Thus, an 8½ inch by 11 inch page will have 2550 pixels in each horizontal scan row. The values for the locations of pixels in each horizontal scan row therefore will range from 0 to 2549. As can be appreciated, the term "horizontal scan rows" is used with reference to typical devices that scan each row of pixels in a horizontal direction. The present invention is equally applicable to devices that scan in the vertical direction.

The present invention is embodied in a system 10 shown in the functional block diagram of FIG. 1. The system 10 comprises a central processing unit (CPU) 12 and a memory 14, which may include both random access memory (RAM) and read-only memory (ROM). A data storage area 16, which may be part of the memory 12, contains the raster font or other image data to be processed by the system 10. It should be understood that the system 10 can process the image data without requiring the entire image to be stored in the data storage area 16. In a typical application, the data storage area 16 may be a temporary buffer that receives a portion of the image data and processes the image data in real-time as a stream of data. If the system 10 is contained within a FAX machine, a scan engine 18 may be used to scan printed pages for transmission. The data from the scan engine 18 is provided to the data storage area 16, which acts as a temporary buffer to hold the image data while the system 10 processes the data stream in real-time.

A printer 20 is used by the system 10 to print received image data. The printer 20 may be an integral part of the system 10 if the system is a FAX machine or a copier. Alternatively, the printer 20 may be a stand alone device.

A conventional change vector generator 22 sequentially analyzes each horizontal scan row to determine the location at which the pixels in the horizontal scan row change from the first logic state to the second logic state, and from the second logic state to the first logic state. The locations of the changes in logic state are relative to a first end of the horizontal scan row and thus may be viewed as vectors having an origin at the beginning of each horizontal scan row, a horizontal direction, and a length being indicated by the relative position of each pixel that changes logic states with respect to the logic state of the prior pixel in the horizontal scan row.

The change vector generator 22 stores the change vectors for each of the horizontal scan rows in a change vector table 24. As with the data storage area 16, the change vector table 24 need not contain the change vectors for all horizontal scan rows in an image. The change vector table 24 may contain only the change vectors for one horizontal scan row at a time.

A chaingon generator 26 analyzes the data in the change vector table 24 and creates one or more chaingons to represent the raster image data. Chaingons are defined as a series of pixels having the same logic state that are adjacent in the horizontal direction, the vertical direction, or diagonally. The creation of chaingons will be discussed in detail below. In the presently preferred embodiment, chaingons are defined as visible pixels that are adjacent in the horizontal direction, the vertical direction, or diagonally. The chaingons are stored within a chaingon table 28, which may be part of the memory 14.

A chaingon encoder 30 analyzes each chaingon separately and encodes the chaingon. The encoded chaingons may then be compressed and stored in a compressed data storage area 32, which may be part of the memory 14. The various components of the system 10 described above are interconnected by a bus 34 which may carry timing signals, and power as well as data signals.

Figure 2:
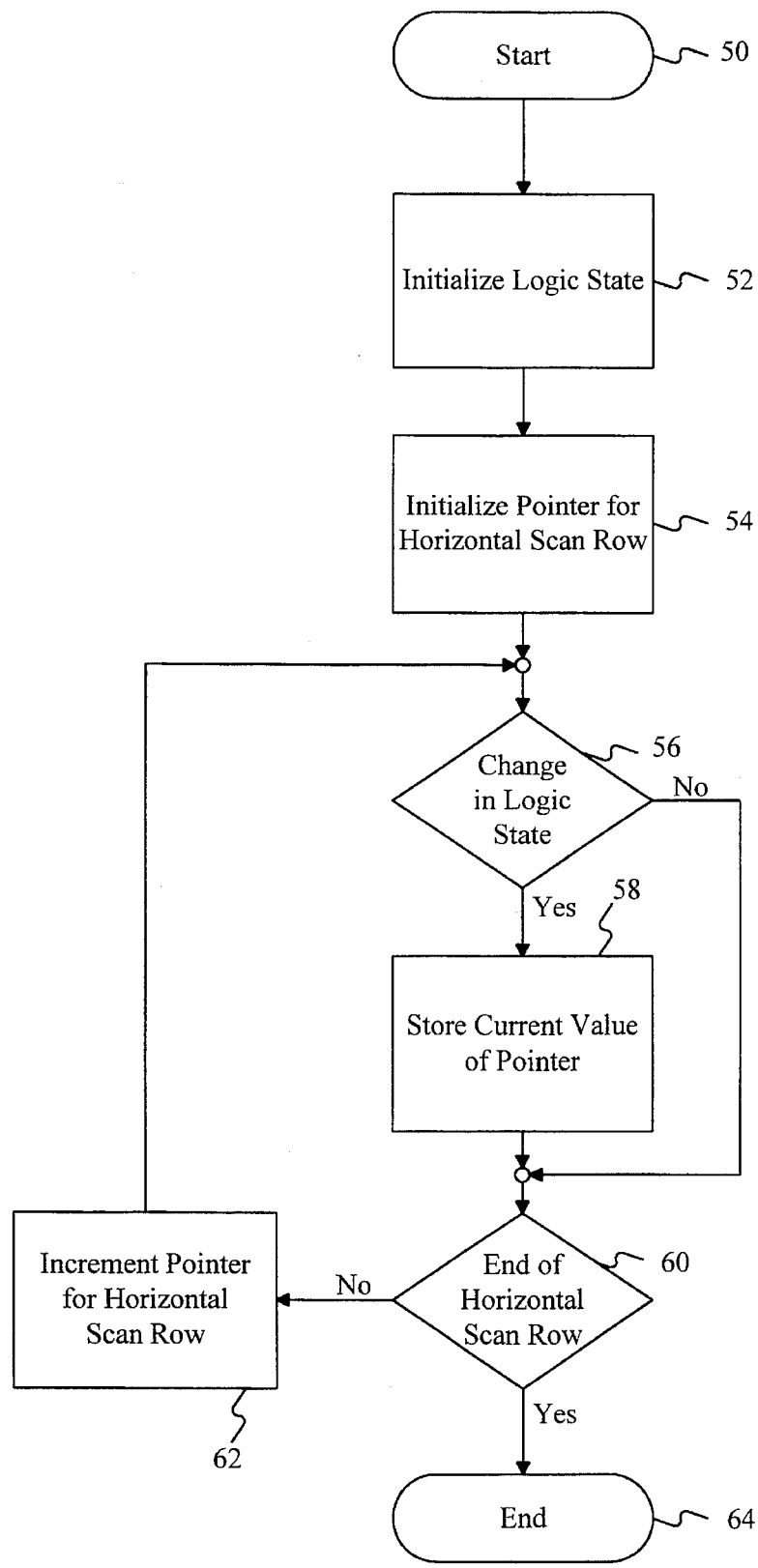
FIG. 2 is a flowchart of the method used by the system of FIG. 1 to generate change vector tables.

The method used by the system 10 to generate change vectors for the horizontal scan row is illustrated in the flowchart of FIG. 2 where the method starts at step 50. In step 52, the change vector generator 22 (see FIG. 1) establishes an initial value for the logic state of the horizontal scan row being analyzed. In the present invention, starting at a first end of the horizontal scan row, such as the left end if the system 10 is analyzing the horizontal scan row from left to right, each horizontal scan row is assumed to start with a white pixel (i.e., an invisible pixel). In step 54, the change vector generator 22 initializes a pointer for the horizontal scan row to point to this first pixel. In decision 56, the change vector generator 22 determines whether the logic state of the pixel indicated by the pointer is different from the logic state of the previous pixel in the horizontal scan row. If there is a change in logic state from the previous pixel, the result of decision 56 is YES. In that event, the change vector generator 22 stores the current value of the pointer in the change vector table 24 (see FIG. 1) in step 58. It should be noted that each value in the change vector table 24 is a change vector for the particular horizontal scan row. If there was not a change in the logic state from the previous pixel, the result of decision 56 is NO. If the result of decision 56 is NO or upon execution of step 58, the change vector generator 22 in decision 60 determines whether the current value of the pointer corresponds to the second end of the horizontal scan row. If the current value of the pointer does not correspond to the second end of the horizontal scan row, the result of decision 60 is NO. In that event, the change vector generator 22 increments current value of the pointer for the horizontal scan row in step 62, and returns to decision 56 to continue the analysis of the horizontal scan row. If the current value of the pointer does correspond to the second end of the horizontal scan row, the result of decision 60 is YES, and the change vector generator 22 ends the analysis for the horizontal scan row in step 64.

Figure 3:
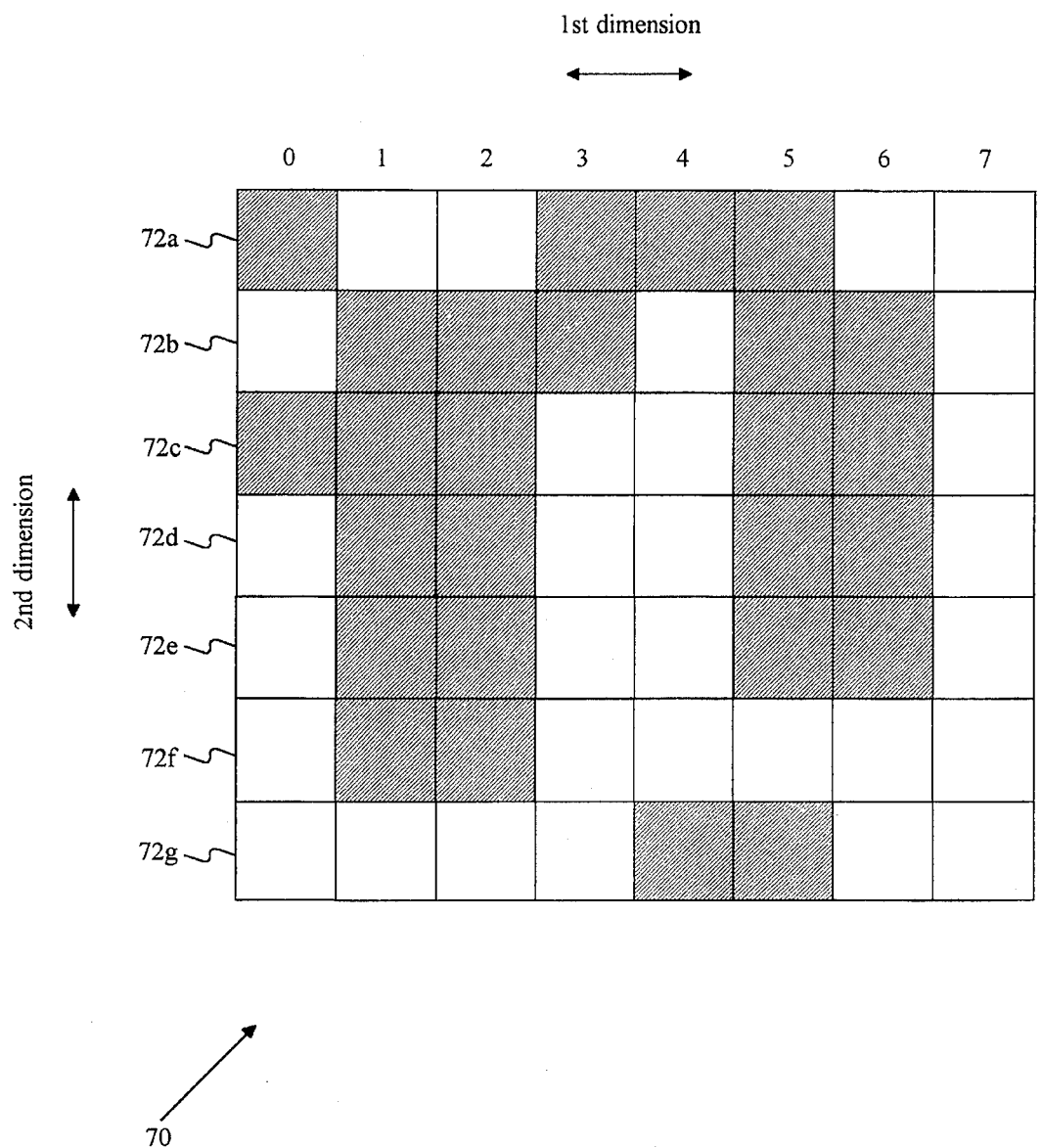
FIG. 3 is a sample bit-map data file illustrating the generation of change vectors using the flowchart of FIG. 2.

An example of the operation of the change vector generator 22 is illustrated in FIG. 3 where a portion 70 of a raster image is shown. The raster image is stored as a bit map data file in the data storage area 16 (see FIG. 1). The portion 70 comprises seven horizontal scan rows 72a through 72g. The change vector generator 22 sequentially scans the pixels in each of the horizontal scan rows 72a through 72g and determines the change vectors for each horizontal scan row in the manner described in the flowchart of FIG. 2. The first horizontal scan row 72a contains a change at pixel 0 (assuming a white initial pixel). Therefore, the first change vector for the first horizontal scan row 72a terminates at pixel 0, and the second change vector terminates at pixel 1 (the location where the pixel changes from black to white). Other change vectors terminate at pixels 3 and 6. Thus, the magnitudes of the change vectors for the first horizontal scan row 72a are 0, 1, 3, and 6. The change vectors are processed in pairs by the system 10. Each pair of change vectors indicates a series of pixels on a horizontal scan row that have the same logic state. Each series of pixels defined by a change vector pair may be thought of as a run of pixels. The very first change vector on a horizontal scan row indicates the location where a run of black pixels begins. The second change vector indicates the location on the horizontal scan row where a run of white pixels begins. Thus, the first change vector of a change vector pair is considered to be inclusive while the second change vector of the change vector pair is considered to be exclusive. That is, the first change vector of the change vector pair indicates a pixel location where a run of black pixels begins, while the second change vector of the change vector pair indicates the location after the last pixel in the particular run of black pixels. It should be noted that a run of pixels may be as short as one pixel or as long as the entire horizontal scan row. It should be realized that the same type of processing could be performed by defining a black initial pixel and using white pixels as the first change vector of a change vector pair. The change vector pairs for the horizontal scan rows 72a through 72g of FIG. 3 are shown below in Table 1.

TABLE 1

| Change Vector Table | |
| --- | --- |
| Horizontal Scan Row | Change Vector Pairs |
| 72a | (0, 1), (3, 6) |
| 72b | (1, 4), (5, 7) |
| 72c | (0, 3), (5, 7) |
| 72d | (0, 3), (5, 7) |
| 72e | (1, 3), (5, 7) |
| 72f | (1, 3) |
| 72g | (4, 6) |

The change vector generator 22 stores the change vector pairs in the change vector table 24. As previously stated, the change vector table 24 need not contain the change vectors for all horizontal scan rows to begin the process of generating chaingons.

The chaingon generator 26 sequentially analyzes the change vector pairs for each horizontal scan row and places the visible pixels into one or more chaingons. The system 10 will generate one or more chaingons for the entire raster image by analyzing the change vectors for the raster image one horizontal scan row at a time. As previously discussed, chaingons are defined as visible pixels that are adjacent in the horizontal direction, the vertical direction, or diagonally. For example, the pixels 3 to 5 in the horizontal scan row 72a are adjacent in the horizontal direction. Therefore, the chaingon generator 26 will assign them to one chaingon. The pixels 5 to 6 in the horizontal scan row 72b are adjacent to each other in the horizontal direction and are also adjacent to the pixels 3 to 5 in the horizontal scan row 72a. Therefore, the pixels 5 to 6 in the horizontal scan row 72b will be added to the chaingon that includes the pixels 3 to 5 in the horizontal scan row 72a. Similarly, the pixels 5 to 6 in the horizontal scan row 72c are adjacent to each other in the horizontal direction and are also adjacent to the pixels 5 to 6 in the horizontal scan row 72b. Therefore, the pixels 5 to 6 in the horizontal scan row 72c will be added to the chaingon that includes the pixels 5 to 6 in the horizontal scan row 72b and the pixels 3 to 5 in the horizontal scan row 72a. The open chaingon will continue to grow in this manner until the chaingon generator finds a horizontal scan row that has no addition pixels that are adjacent to the open chaingon in either the vertical or diagonal direction. For example, the horizontal scan row 72f contains no pixels that overlap the pixels 5 to 6 in the horizontal scan row 72e in either the vertical or diagonal directions. Therefore, the chaingon generator will close the open chaingon. It should be noted that other chaingons may continue to remain open so long as there are new pixels to add to the chaingon in each horizontal scan row. It should also be noted that not all contiguous pixels are in the same chaingon. As will be discussed below, where a particular pixel could fall into more than one chaingon, an arbitrary rule is used to assign the pixel to one chaingon.

Change vectors are used to efficiently determine the location of runs of black pixels on the horizontal scan rows and to define the chaingons. Alternatively, the chaingon generator 26 could analyze the bit-map data file itself to determine the locations at which the pixels change logic states. The chaingon generator 26 creates or opens a chaingon for each of the change vector pairs on the first horizontal scan row that contains change vectors because each of the change vector pairs in the horizontal scan row indicate separate runs of black pixels that are not adjacent in the horizontal direction. The chaingons opened by the chaingon generator 26 will remain open so long as each subsequent horizontal scan row contains change vectors that overlap are adjacent to a change vector in the previous horizontal scan row either vertically or diagonally.

Figure 4:
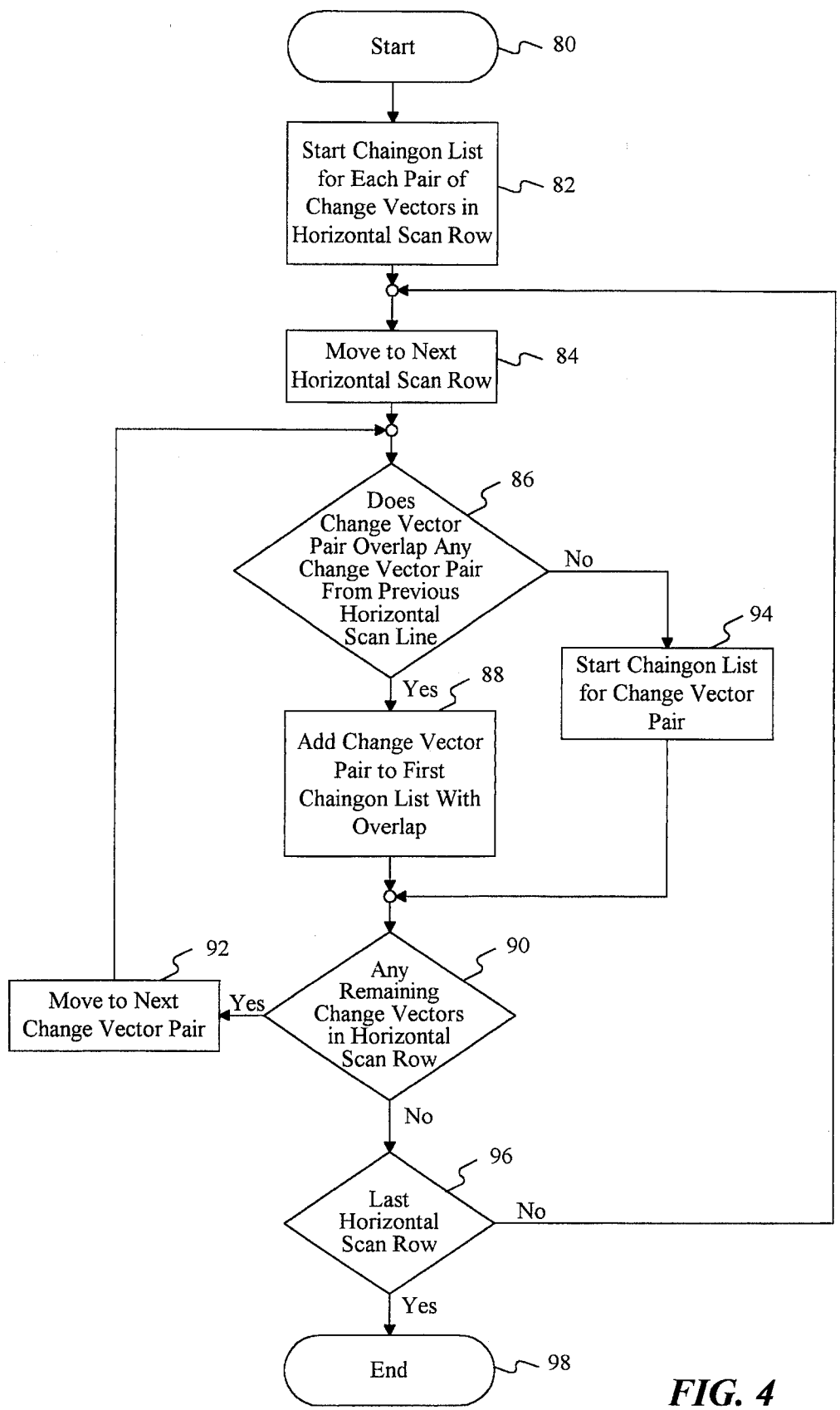
FIG. 4 is a flowchart of the method used by the system of FIG. 1 to generate chaingons.

The flowchart of FIG. 4, taken in conjunction with Table 1 above, may be used to illustrate the process of generating chaingons. The chaingon generator 26 (see FIG. 1) starts at step 80 with all change vectors having been previously generated in accordance with the flowchart of FIG. 2.

In step 82, the chaingon generator 26 starts a chaingon list for each of the change vector pairs in the first horizontal scan row that contains change vectors. As can be appreciated, there may be several horizontal scan rows that do not have any change vectors, as may be common at the top of a facsimile page. From Table 1, it can be seen that the first horizontal scan row 72a has the following change vector pairs: (0,1),(3,6). The two change vector pairs indicate that there are two runs of black pixels in the horizontal scan row 72a. The first run of black pixels starts at pixel 0 and ends at pixel 1 thus indicating a run of only one black pixel. The second run of black pixels starting at pixel 3 and ending at pixel 6, thus indicating a run of three black pixels. Because the horizontal scan row 72a is the first horizontal scan row being analyzed, there are no open chaingons, and the chaingon generator 26 will open two chaingons. The first chaingon contains pixel 0, and the second chaingon contains pixels 3, 4, and 5. The chaingon generator 26 will create a chaingon list containing the change vector pairs associated with each of the chaingons. The chaingon lists, which contain change vector pairs, are stored within the chaingon table 28.

In step 84, the chaingon generator 26 moves to the next horizontal scan row. In decision 86, the chaingon generator 26 determines whether a pair of change vectors in the horizontal scan row currently being analyzed overlaps any change vector pairs from the horizontal scan row just previously analyzed. The phrase "overlap" refers to a change vector pair whose corresponding pixels are adjacent to the pixels in any open chaingon in either the vertical or diagonal direction. The overlap can be determined mathematically by comparing the change vector pairs for the horizontal scan row currently being analyzed to the change vector pair or pairs from the previously analyzed horizontal scan row to determine if there is overlap. For example, the pixels 5 and 6 of the horizontal scan row 72b overlap the pixels 3 to 5 of the horizontal scan row 72a in the vertical direction (i.e., the pixel 5 of the horizontal scan row 72b is vertically adjacent to the pixel 5 of the horizontal scan row 72a). Therefore, the change vector pair (5,7) in the horizontal scan row 72b will be added to the open chaingon containing the change vector pair (3,6) in the horizontal scan row 72a.

From Table 1, it can be seen that the horizontal scan row 72b has the following change vector pairs: (1, 4), (5, 7).

These change vector pairs indicate a first run of black pixels starting at pixel 1 and ending at pixel 4, and a second run of black pixels starting at pixel 5 and ending at pixel 7. The chaingon generator 26 compares the change vector pairs for the horizontal scan row 72b with the open chaingons to determine if there is any overlap.

As can be seen from Table 1, the first run of black pixels, indicated by the change vector pair (0,1) in the horizontal scan row 72a corresponds to the first open chaingon. The first run of black pixels, indicated by the change vector pair, (1,4), in the horizontal scan row 72b is adjacent to the change vector pair, (0,1), in the horizontal scan row 72a in a diagonal direction. Thus, the result of decision 86 is YES.

The first run of black pixels in the horizontal scan row 72b is also adjacent to the second chaingon in a vertical direction because the pixel 3 in the horizontal scan row 72b is under the pixel 3 in the horizontal scan row 72a, which is part of the second chaingon. Thus, the change vector pair corresponding to the first run of black pixels in the horizontal scan row 72b could be placed in either the first or second chaingons. When a run of pixels could be placed in more than one chaingon, the chaingon generator 26 arbitrarily assigns the pixels to the earliest opened of those chaingons. Therefore, in step 88, the first change vector pair, corresponding to the first run of black pixels in the horizontal scan row 72b, is placed in the chaingon list for the first chaingon. Alternatively, the first change vector pair, corresponding to the first run of black pixels in the horizontal scan row 72b, could be placed in the chaingon list for the second chaingon.

In decision 90, the chaingon generator 26 determines if there are any additional change vector pairs remaining on the horizontal scan row currently being analyzed. If there are remaining change vector pairs on the horizontal scan row, the result of decision 90 is YES, and in step 92 the chaingon generator moves to the next change vector pair for the horizontal scan row currently being analyzed at step 92 and returns to decision 86. In the example of Table 1, there is a remaining change vector pair, (5,7), for the horizontal scan row 72b. The chaingon generator 22 will return to decision 86 and determine that the second pair of change vectors belong in the second chaingon. The chaingon generator will place the second pair of change vectors in the second chaingon list. The chaingon generator repeats this process for each of the change vector pairs for the horizontal scan row 72b.

When there are no remaining change vector pairs on the horizontal scan row currently being analyzed, the result of decision 90 is NO, and the chaingon generator 26 moves to decision 96 to determine if the horizontal scan row currently being analyzed is the last horizontal scan row in the data file. If there are more horizontal scan rows to be analyzed, the result of decision 96 is NO, and the chaingon generator 26 returns to step 84 to analyze the next horizontal scan row 72c with respect to the horizontal scan row just analyzed. In the example of FIG. 3, the change vector generator 22 and the chaingon generator 26 analyze the horizontal scan rows from top to bottom. Each horizontal scan row is analyzed from left to right. Those skilled in the art will appreciate that the principles of the present invention may be applied to any bit-map data file starting at the top or bottom and analyzing from left to right or right to left. For example, it may be more efficient to encode from top to bottom instead of left to right if the bit-map data file contains characters that are in a landscape mode. Alternatively, it may also be more efficient to generate one or more chaingons to encode the background pixels rather than the foreground pixels. The present invention is intended to encompass chaingon generation of any logic state in any direction in the bit-map data file.

In the above example, the horizontal scan row 72b is not the last horizontal scan row. Therefore, the chaingon generator 26 returns to step 84 and will analyze the horizontal scan row 72c. From Table 1, it can be seen that the horizontal scan row 72c has the following change vector pairs: (0, 3), (5, 7). Because the pixels 0, 1, and 2 in the horizontal scan row 72c overlap the pixels 1, 2, and 3 in the horizontal scan row 72b, and the pixels 1, 2, and 3 in the horizontal scan row 72b are part of the first chaingon, the chaingon generator 26 assigns the first pair of change vectors (0,3) to the first chaingon list. Because there is an overlap between the second run of black pixels in the horizontal scan row 72c and the second chaingon, the chaingon generator 26 assigns the second pair of change vectors (5,7) to the second chaingon.

If the change vector pair is not within one pixel of a chaingon from the previous horizontal scan row, the result of decision 86 is NO. In that event, in step 94, the chaingon generator 26 starts new chaingon list for the change vector pair in the current horizontal scan row. Any chaingon list that does not have a new change vector pair added for the current horizontal scan row is closed or retired. This means that the particular chaingon list will not get any larger, and the particular chaingon is now completely defined by the change vector pairs in the chaingon list. For example, it can be seen that the horizontal scan row 72f has only one change vector pair: (1, 3). When the chaingon generator 26 analyzes the horizontal scan row 72f, it determines that there is no change vector pair that overlaps the second chaingon in the horizontal scan row 72e. Therefore, the second chaingon is closed. The chaingon list for the second chaingon contains change vector pairs for the horizontal scan rows 72a through 72e. Similarly, there are no change vector pairs in the horizontal scan row 72g that overlap the first chaingon in the horizontal scan row 72f. Therefore, the first chaingon is closed when the chaingon generator analyzes the horizontal scan row 72g. The chaingon list for the first chaingon contains change vector pairs for the horizontal scan rows 72a through 72f.

As can be seen from the change vectors in Table 1, there is a change vector pair, (4,6), for the horizontal scan row 72g. The pixels corresponding to the change vector pair (4,6) in the horizontal scan row 72g are not adjacent to any pixels corresponding to change vectors from the previous horizontal scan row 72f. Because there are no chaingons with which the change vector pair in the horizontal scan row 72g overlap, the chaingon generator 26 starts a third chaingon that contains only the change vector pair (4,6) in the horizontal scan row 72g. After starting a new chaingon in step 94, the chaingon generator 22 moves to decision 90 to determine if there are other change vector pairs of the current horizontal scan row.

The chaingon generator 26 continues the sequential analysis of each remaining horizontal scan row until all horizontal scan rows have been analyzed and change vector pairs have been assigned to a chaingon list. If there are no more horizontal scan rows to be analyzed, the result of decision 96 is YES, and the chaingon generator 26 closes any open chaingons and ends the process of generating chaingons in step 98. In the example of FIG. 3, the third chaingon is closed because there are no more pixels that can overlap in subsequent horizontal scan rows.

The chaingon lists are stored in the chaingon table 28 (see FIG. 1). The chaingon table created for the pixels of FIG. 3 is set forth in Table 2 below.

TABLE 2

Chaingon Table

| Hor. Scan Row | Chaingon No. 1 | Chaingon No. 2 | Chaingon No. 3 |
|---|---|---|---|
| 72a | (0, 1) | (3, 6) | |
| 72b | (1, 4) | (5, 7) | |
| 72c | (0, 3) | (5, 7) | |
| 72d | (1, 3) | (5, 7) | |
| 72e | (1, 3) | (5, 7) | |
| 72f | (1, 3) | closed | |
| 72g | closed | | (4, 6) |
| | | | closed |

The system 10 formats the chaingon lists in a manner that permits the easy encoding of each chaingon. Each formatted chaingon list includes a header containing information related to the position of the upper left corner of the chaingon in the raster image data file and the length of the chaingon (in number of horizontal scan rows), followed by the data for each horizontal scan row within the chaingon. Using the data of Table 2 for chaingon Nos. 1 through 3, the formatted chaingon lists are represented in Table 3 below.

TABLE 3

| Chaingon No. 1 | Chaingon No. 2 | Chaingon No. 3 |
|---|---|---|
| X Offset = 0 | X Offset = 3 | X Offset = 4 |
| Y Offset = 0 | Y Offset = 0 | Y Offset = 6 |
| Y Extent = 6 | Y Extent = 5 | Y Extent = 1 |
| (0, 1) | (0, 1) | (0, 1) |
| (1, 4) | (0, 1) | |
| (0, 3) | (0, 1) | |
| (1, 3) | (0, 1) | |
| (1, 3) | (0, 1) | |
| (1, 3) | | |

The X and Y Offsets in the header for the first chaingon (Chaingon No. 1) indicates that the chaingon starts at the first pixel of the first horizontal scan row. Similarly, the X and Y Offsets in the headers for the second and third chaingons (Chaingon No. 2 and Chaingon No. 3, respectively), indicate that they start at the fourth pixel of the first horizontal scan row, and at the fifth pixel of the seventh horizontal scan row, respectively. The Y Extent in the header for the first chaingon indicates that the chaingon is six horizontal scan rows in length, while the Y Extent in the headers for the second and third chaingons indicate that they have lengths of five and one horizontal scan rows, respectively. In this manner, the entire raster image data file is placed into a series of one or more chaingons.

Once the system 10 has defined the chaingon lists, stored the chaingon lists in the chaingon table 28 (see FIG. 1), and formatted the chaingon lists in the manner described above, it encodes each chaingon independently using delta encoding on each chaingon. Delta encoding is a well known form of data encoding that will be described only briefly herein. It is not necessary for the system 10 to have all chaingons completely defined before the delta encoding can begin. For example, the second chaingon in FIG. 3 is closed during the analysis of horizontal scan row 72f. The chaingon encoder 30 (see FIG. 1) can begin encoding the second chaingon while the chaingon generator 26 is still analyzing the entries in change vector table 24 for horizontal scan row 72g.

Figure 5:
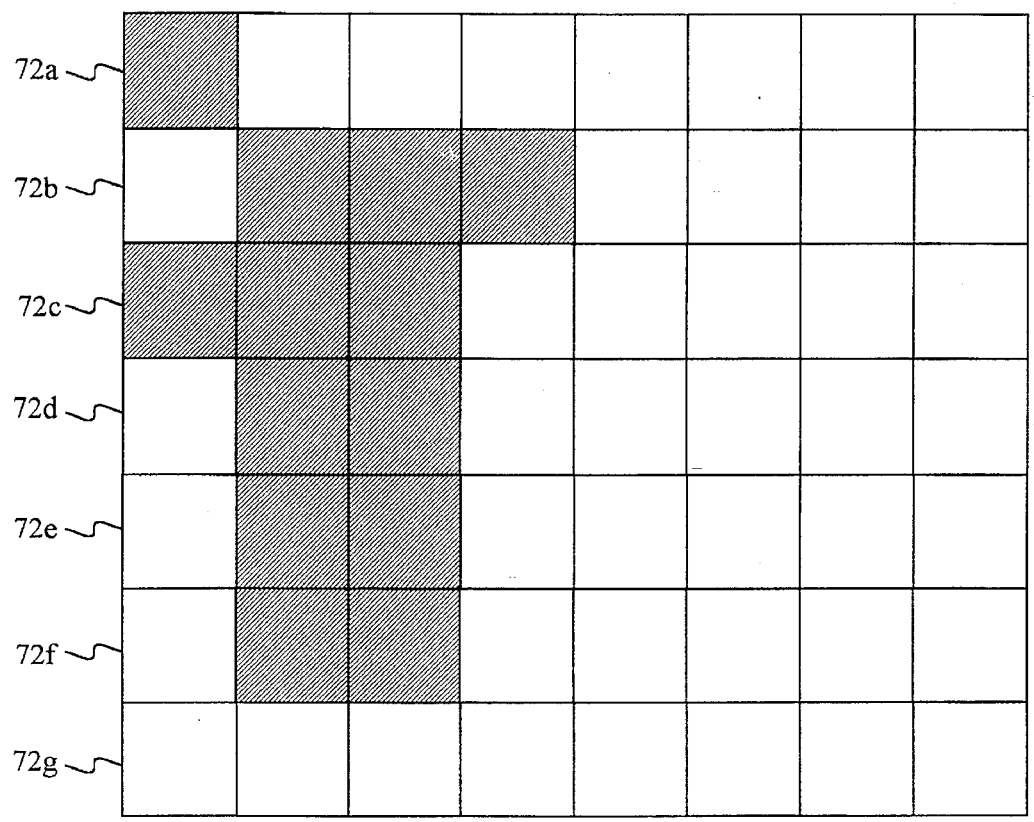
FIG. 5 is a sample bit-map data file illustrating the generation of chaingons using the flowchart of FIG. 4.
Figure 5:
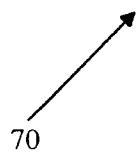

The chaingon encoder 30 encodes each chaingon by encoding the chaingon data associated with each horizontal scan row of the chaingon relative to the chaingon data in the previous horizontal scan row. Thus, the chaingon data in each horizontal scan row is encoded as a delta or offset value relative to the chaingon data from the previous horizontal scan row. For example, the first chaingon in FIG. 3 is shown alone in FIG. 5 to better illustrate the encoding process. As previously discussed, Table 3 indicates that the first chaingon starts at the first pixel of the first horizontal scan row and is six horizontal scan rows in length. The first change vector pair in the data portion of the formatted first chaingon list of Table 3 following the header is the change vector pair (0,1). The next change vector pair, (1,4) for the first chaingon is encoded relative to the previous entry. For the example of FIG. 3, the delta values for the next change vector pair, (1,4), for the first chaingon are (+1, +3), indicating that the run of black pixels in the next horizontal scan row starts one pixel to the right of the previous starting location and ends three pixels to the right of the previous ending location. These delta values may be easily determined by subtracting the previous chaingon data from the current chaingon data. The original chaingon change vector pairs and the delta values for the first chaingon are shown in Table 4 below.

TABLE 4

| Chaingon No. 1 | Delta Encoding Values |
|---|---|
| X Offset = 0 | |
| Y Offset = 0 | |
| Y Extent = 6 | |
| (0, 1) | (0, 1) |
| (1, 4) | (+1, +3) |
| (0, 3) | (−1, −1) |
| (1, 3) | (+1, 0) |
| (1, 3) | (0, 0) |
| (1, 3) | (0, 0) |

As can be seen from Table 4, the use of delta encoding can reduce the size of the data values because every delta value is merely an offset from the previous data value. The delta values are generally small because chaingons, by definition, are closely related pixels within the bit-map data file. Each delta value is represented by several data bits. Because most delta values tend to be small, it makes the encoding process more predictable. As illustrated in greater detail below, this permits the delta encoding to use a smaller number of data bits for the most common offset values and a larger number of data bits for larger, less common, offset values. This type of statistical encoding is well known in the art. For example, Modified Huffman coding, which is commonly used in facsimile data encoding, relies on statistics to select a small number of data bits for more common data patterns, and a larger number of data bits for less common data patterns.

Figure 6:
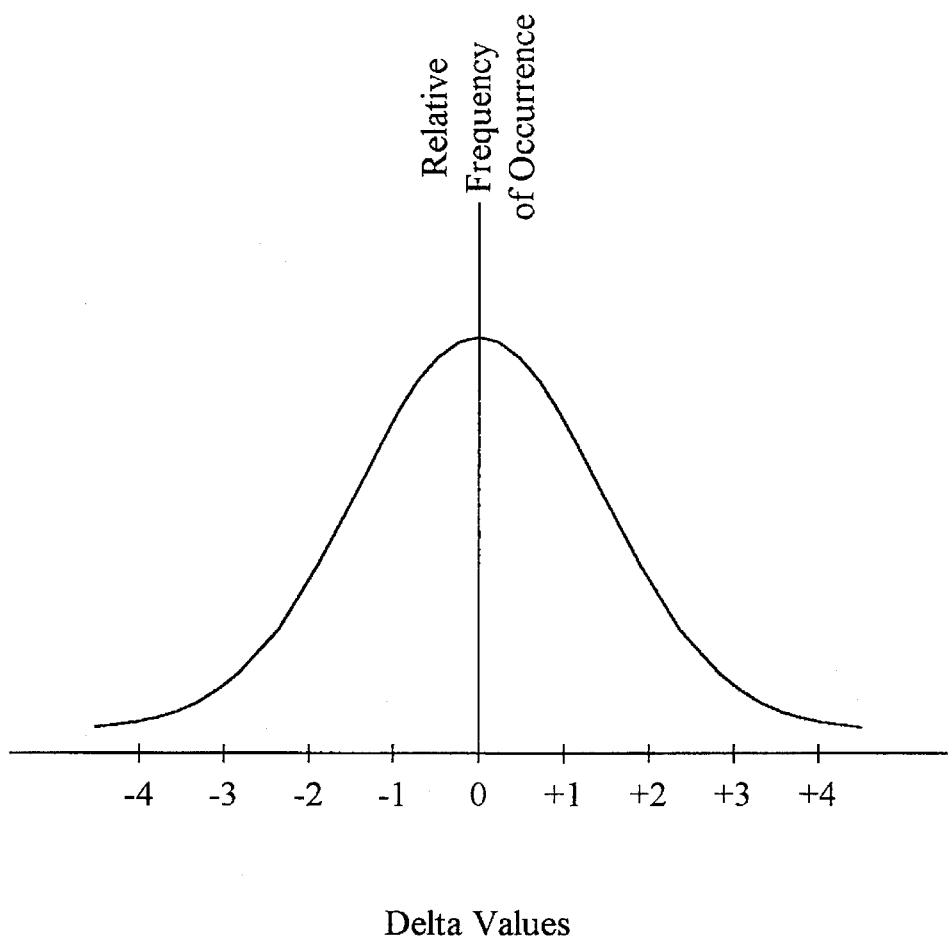
FIG. 6 illustrates the predictive coding frequency used by the encoding portion of the system of FIG. 1.

The curve shown in FIG. 6 illustrates the statistical nature of the delta encoding process for chaingons. A zero offset value is very common and occurs with the greatest frequency. The offset values of +1 and −1 are the next most common. Other offset values occur with less frequency. The system 10 uses two data bits to represent the three most common offset values. For example, the data bits 00 represent a zero offset value. The data bits 01 represent a +1 offset value, while the data bits 11 represent a −1 offset value. Less common offset values are represented with more data bits. For example, the data bits 1011 represent a +2 offset value while the data bits 1010 represent a −2 offset value. Similarly the data bits 1001 represent a +3 offset value. More data bits are required to represent less common offset values. Using the delta encoding values for the first chaingon in Table 4 and the data bit patterns described above, one can determine that the encoded data for the first chaingon is as follows: 00 01 01 1001 11 11 01 00 00 00 00 00.

The encoded data generated by the chaingon encoder 30 require no delimiter to identify the end of one code and the start of a new code. The data bits in each of the codes are unique and the system 10 recognizes the end of a particular code by the pattern of data bits in the code. This encoding shares the well known prefix property of Huffman codes. For example, the first data bits 00 in the example above represents a 0 offset value. There are no other data bit patterns that begin with the data bits 00. Thus, the system 10 recognizes the data bits 00 as a complete code. Similarly, the data bits 01 represent a +1 offset value. There are no other data bit patterns that begin with the data bits 01. Thus, each code is uniquely identified by the pattern of data bits.

Once the delta encoded data bits representing the offset values have been determined by the chaingon encoder 30, the delta encoded data bits may be further compressed prior to transmission to the receiving computer. To do this, the system 10 uses LZ data compression, which further compresses the delta encoded data bits. LZ data compression is well known in the art and will not be described herein. Alternatively, a number of other well known data compression techniques, such as run length encoding (RLE) or Huffman encoding can be used. The present invention is not limited by the specific order in which the compression techniques are applied. For example, the system 10 could perform Huffman encoding followed by LZ data compression. Alternatively, the system 10 could first use LZ data compression followed by Huffman encoding. The compressed data for the chaingons is stored in the compressed data storage area 32 (see FIG. 1), which may be part of the memory 14.

The compressed data in the compressed data storage area 32 may be embedded within the text data or facsimile message, as previously discussed, and transmitted along with the data or message. The compressed data may be efficiently decompressed by reversing the compression process applied to the data. Because compression and decompression of data is well known in the art, it will not be described herein.

The chaingon data can be decoded by reversing the process described above. As can be seen, the data bit patterns for the first chaingon indicate the offset values from the start of the chaingon. The X and Y offsets and the Y extent indicate the location and number of horizontal scan lines for the first chaingon. With this information, the decoding process may be easily performed. For data comprising several multiple chaingons, each chaingon can be successively decompressed into a single buffer, combining with previous chaingons with a logical OR operation. Filling a run of pixels is fast, particularly for repeated runs that fit within a machine word size (e.g., 32 bits).

The chaingon representation permits raster image data, such as a character font set, to be represented in a dramatically smaller amount of space than a typical character font set. The data in Table 5 below indicates the amount of data storage required by typical character font sets using conventional techniques, the same character font sets processed by the system 10 into chaingons, and the chaingons that have been further compressed using LZ data compression.

TABLE 5

| | Font Size (Kbytes) | | | | | | | | | | | |
|---|---|---|---|---|---|---|---|---|---|---|---|---|
| | Raster | | | | Chaingon Only | | | | Chaingon-LZ | | | |
| Size | Arial | Courier | Times | Corsiva | Arial | Courier | Times | Corsiva | Arial | Courier | Times | Corsiva |
| 8 | 8.8 | 7.8 | 8.0 | 7.8 | 2.7 | 2.6 | 2.8 | 3.1 | 1.0 | 1.0 | 1.0 | 1.3 |
| 12 | 14.6 | 14.0 | 14.4 | 10.9 | 3.4 | 3.3 | 3.5 | 4.1 | 1.5 | 1.4 | 1.5 | 2.0 |
| 16 | 23.0 | 21.9 | 18.5 | 18.5 | 4.0 | 3.9 | 4.3 | 5.1 | 2.0 | 1.9 | 2.4 | 3.2 |
| 24 | 46.7 | 46.5 | 45.1 | 38.5 | 5.3 | 5.0 | 6.0 | 6.8 | 3.5 | 3.2 | 4.0 | 6.2 |

As can be seen from Table 5, a 12 point Times-Roman character font set requires 14.4 Kbytes of storage by prior art systems. In contrast, the system 10 permits the same character font set to be stored in as little as 3.5 Kbytes. Compressing the chaingon data using LZ data compression results in the same character font set requiring only 1.5 Kbytes. Thus, the use of the system 10 permits a savings of nearly 13 Kbytes. The savings in space is even more dramatic for larger font sizes.

While data compression itself can save space when compared to the character font set data, the system 10 permits greater savings in space than would be gained with data compression alone. The data shown in Table 6 below provides compression ratios for the chaingons alone, for LZ data compression alone, and for the combination of chaingons and LZ data compression.

TABLE 6

| | Compression Ratio (X:1) | | | | | | | | | | | |
|---|---|---|---|---|---|---|---|---|---|---|---|---|
| | Chaingon Only | | | | LZ Only | | | | Chaingon-LZ | | | |
| Size | Arial | Courier | Times | Corsiva | Arial | Courier | Times | Corsiva | Arial | Courier | Times | Corsiva |
| 8 | 3.2 | 3.0 | 2.9 | 2.5 | 2.7 | 2.7 | 2.7 | 2.3 | 8.7 | 8.0 | 7.9 | 5.8 |
| 12 | 4.3 | 4.2 | 4.1 | 2.7 | 2.3 | 2.3 | 2.3 | 2.0 | 9.9 | 9.8 | 9.4 | 5.3 |
| 16 | 5.7 | 5.7 | 4.3 | 3.6 | 2.0 | 2.0 | 1.8 | 1.6 | 11.4 | 11.4 | 7.7 | 5.8 |
| 24 | 8.8 | 9.2 | 7.5 | 5.6 | 1.5 | 1.6 | 1.5 | 1.1 | 13.2 | 14.8 | 11.3 | 6.2 |

As can be seen from Table 6, chaingon processing of a 12 point Times-Roman character font set results in a 4.1:1 compression ratio over the character font set data. The use of LZ data compression alone results in a 2.3:1 compression ratio. This indicates that the chaingon rasterization process alone is an improvement over the use of data compression alone. If chaingon rasterization is combined with LZ data compression, the compression ratio is 9.4:1. Thus, it can be readily seen that the system 10 provides a useful tool for processing raster image data. The savings in space and the ease of processing the data using the system 10 means that many more devices can incorporate image processing capabilities. The devices ultimately have lower cost because less memory is required to process image data, and a less sophisticated and less expensive CPU is required to process the data.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for the compression of a bit-map data file representing an orthogonal array of pixels having a series of pixels arranged in a first dimension and a plurality of the series of pixels arranged in a second dimension, each of said pixels having first and second logic states, the system comprising:

a data file storage area containing the bit-map data file in uncompressed form;

a change vector generator coupled to said data file storage area for sequentially analyzing each of the plurality of series of pixels to determine locations in the first dimension at which the pixels in the series of pixels change from the first logic state to the second logic state and from the second logic state to the first logic state, said change vector generator creating a change vector data table for each of the plurality of series of pixels;

a chaingon generator coupled to said change vector generator to analyze said change vector data tables to apportion the bit-map data file into a plurality of chaingon regions, each of said chaingon regions comprising adjacent pixels having the first logic state;

an encoding analyzer to analyze each of said plurality of chaingon regions to encode the pixels in each of said chaingon regions and generate encoded data for each of said chaingon regions; and a data storage area for storing said encoded data.

2. The system of claim 1 wherein said encoding analyzer uses delta coding.

3. The system of claim 1, further including a compressor receiving said encoded data and generating compressed encoded data.

4. The system of claim 3 wherein said compressor uses RLE compression to compress said encoded data.

5. The system of claim 3 wherein said compressor uses LZ compression to compress said encoded data.

6. The system of claim 3 wherein said compressor uses Huffman compression to compress said encoded data.

7. The system of claim 1 wherein said chaingon generator creates a chaingon list for each of said chaingon regions using said change vector tables, said chaingon generator analyzing said change vector tables for a first and second sequential ones of the plurality of series of pixels and assigning pixels from said first and second adjacent series of pixels to a first chaingon list if pixels in said first adjacent series of pixels have the first logic state and are adjacent to pixels in said second adjacent series of pixels that also have the first logic state.

8. A system for the compression of a bit-map data file representing an orthogonal array of pixels having a series of pixels arranged in a first dimension and a plurality of the series of pixels arranged in a second dimension, each of said pixels having first and second logic states, the system comprising:

a chaingon generator for analyzing the bit-map data file to apportion the bit-map data file into a plurality of chaingon regions, each of said chaingon regions comprising adjacent pixels having the first logic state;

an encoding analyzer analyzing each of said plurality of chaingon regions and encoding the pixels in each of said chaingon regions to generate encoded data for each of said chaingon regions; and a data storage area for storing said encoded data.

9. The system of claim 8 wherein said encoding analyzer uses delta coding.

10. The system of claim 8, further including a compressor receiving said encoded data and generating compressed encoded data.

11. The system of claim 10 wherein said compressor compresses said encoded data using a predetermined compression format comprising at least one of a RLE compression, LZ compression, and Huffman compression.

12. The system of claim 8 wherein said chaingon generator creates a chaingon list for each of said chaingon regions, said chaingon generator analyzing the bit-map data file for a first and second sequential ones of the plurality of series of pixels and assigning pixels from said first and second adjacent series of pixels to a first chaingon list if pixels in said first adjacent series of pixels have the first logic state and are adjacent to pixels in said second adjacent series of pixels that also have the first logic state.

13. A system for the generation of an encoded data file from a bit-map data file representing an orthogonal array of pixels having a series of pixels arranged in a first dimension and a plurality of the series of pixels arranged in a second dimension, each of said pixels having first and second logic states, the system comprising:

a change vector generator to sequentially analyze each of the plurality of series of pixels in the bit-map data file to determine locations in the first dimension at which the pixels in the series of pixels change from the first logic state to the second logic state and from the second logic state to the first logic state, said change vector generator creating a change vector data table for each of the plurality of series of pixels; and a chaingon generator coupled to said change vector generator to analyze said change vector data tables to apportion the bit-map data file into a plurality of chaingon regions, each of said chaingon regions comprising adjacent pixels having the first logic state, whereby the bit-map data file is encoded into said chaingon regions.

14. The system of claim 13, further including an encoding analyzer analyzing each of said plurality of chaingon regions and encoding the pixels in each of said chaingon regions to generate encoded data for each of said chaingon regions.

15. The system of claim 14, further including a compressor receiving said encoded data and generating compressed encoded data.

16. The system of claim 15 wherein said compressor compresses said encoded data using a predetermined compression format comprising at least one of a RLE compression, LZ compression, and Huffman compression.

17. The system of claim 13 wherein said chaingon generator generates first and second offset data values for each of said chaingon regions indicating a location of each of said chaingon regions in the first and second dimensions, respectively.

18. The system of claim 17 wherein said chaingon generator generates a length data value indicating a length of each of said chaingon regions in said second dimension.

19. A method using a computer for compressing a bit-map data file representing an orthogonal array of pixels having a series of pixels arranged in a first dimension and a plurality of the series of pixels arranged in the second dimension, each of the pixels having first and second logic states, the method comprising the steps of:

(a) sequentially analyzing each of the plurality of series of pixels to determine locations in the first dimension at which the pixels in the series of pixels change from the first logic state to the second logic state and from the second logic state to the first logic state;

(b) storing the value of said locations for each of the series of pixels in the second dimension in a change vector table;

(c) analyzing said change vector data table to apportion the bit-map data file into a plurality of chaingon regions, each of said chaingon regions comprising adjacent pixels having the first logic state; and (d) analyzing each of said plurality of chaingon regions and encoding the pixels in each of said chaingon regions to generate encoded data for each of said chaingon regions.

20. The method of claim 19 wherein said step (d) of encoding each of said chaingon regions uses delta coding.

21. The method of claim 19, further including the step of compressing said encoded data.

22. The method of claim 21 wherein said step of compressing uses a predetermined compression format comprising at least one of a RLE compression, LZ compression, and Huffman compression to compress said encoded data.

23. The method of claim 19 wherein said step (c) of analyzing said change vector data table, further includes the steps of:

analyzing said change vector table for first and second sequential ones of the plurality of series of pixels; and assigning pixels from said first and second adjacent series of pixels to a first chaingon list if pixels in said first adjacent series of pixels have the first logic state and are adjacent to pixels in said second adjacent series of pixels that also have the first logic state.

24. A method using a computer for generating an encoded data file from a bit-map data file representing an orthogonal array of pixels having a series of pixels arranged in a first dimension and a plurality of the series of pixels arranged in a second dimension, each of the pixels having first and second logic states, the method comprising the steps of:

apportioning the bit-map data file into a plurality of chaingon regions, each of said chaingon regions comprising adjacent pixels having the first logic state; and analyzing each of said plurality of chaingon regions and encoding the pixels in each of said chaingon regions to generate encoded data for each of said chaingon regions.

25. The method of claim 24 wherein said step of encoding each of said chaingon regions uses delta coding.

26. The method of claim 24, further including the step of compressing said encoded data.

27. The method of claim 26 wherein said step of compressing uses a predetermined compression format comprising at least one of a RLE compression, LZ compression, and Huffman compression to compress said encoded data.

28. A method using a computer for generating an encoded data file from a bit-map data file representing an orthogonal array of pixels having a series of pixels arranged in a first dimension and a plurality of the series of pixels arranged in a second dimension, each of the pixels having first and second logic states, the method comprising the steps of:

retrieving the bit-map data file from a storage location; and apportioning the bit-map data file into a plurality of chaingon regions, each of said chaingon regions comprising adjacent pixels having the first logic state.

29. The method of claim 28, further including the step of analyzing each of said plurality of chaingon regions and encoding the pixels in each of said chaingon regions to generate encoded data for each of said chaingon regions.

30. The method of claim 29, further including the step of compressing said encoded data.

31. The method of claim 30 wherein said step of compressing uses a predetermined compression format comprising at least one of a RLE compression, LZ compression, and Huffman compression to compress said encoded data.

* * * * *